United States Patent
Baba et al.

(10) Patent No.: US 9,429,409 B2
(45) Date of Patent: Aug. 30, 2016

(54) INNER DIAMETER MEASURING DEVICE

(71) Applicant: IHI Corporation, Koto-ku, Tokyo (JP)

(72) Inventors: Michiko Baba, Tokyo (JP); Kouzou Hasegawa, Tokyo (JP); Norimasa Taga, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 14/377,226

(22) PCT Filed: Feb. 7, 2013

(86) PCT No.: PCT/JP2013/053598
§ 371 (c)(1),
(2) Date: Aug. 7, 2014

(87) PCT Pub. No.: WO2013/118917
PCT Pub. Date: Aug. 15, 2013

(65) Prior Publication Data
US 2015/0020395 A1    Jan. 22, 2015

(30) Foreign Application Priority Data

Feb. 9, 2012 (JP) ................................ 2012-026049

(51) Int. Cl.
*G01B 5/12* (2006.01)
*G01B 3/50* (2006.01)
(Continued)

(52) U.S. Cl.
CPC . *G01B 3/50* (2013.01); *G01B 5/12* (2013.01); *G01B 11/12* (2013.01); *G01B 21/14* (2013.01)

(58) Field of Classification Search
CPC .......... G01B 5/12; G01B 5/012; G01B 5/08; G01B 5/008; G01B 5/20; G01B 11/007; G01B 21/14; G01B 3/26; G01B 5/201

USPC ........................................................... 33/542
See application file for complete search history.

(56) References Cited

U.S. PATENT DOCUMENTS 1,664,851 A    4/1928  Class
1,721,524 A    7/1929  Moore
(Continued)

FOREIGN PATENT DOCUMENTS

EP    0076144 A2    4/1983
EP    0373514 A1    6/1990
(Continued)

OTHER PUBLICATIONS

International Search Report and Written Opinion mailed Apr. 23, 2013 in co-pending PCT application No. PCT/JP2013/053589.
(Continued)

*Primary Examiner* — Yaritza Guadalupe-McCall
(74) *Attorney, Agent, or Firm* — Nields, Lemack & Frame, LLC (57) ABSTRACT

An inner diameter measuring device (4) for measuring an inner diameter by inserting an inner diameter measuring unit into an inside of a hollow member to be measured, comprises a supporting shaft (18) having the inner diameter measuring unit supported at a forward end, and a supporting mechanism unit (30) for cantilever-supporting the supporting shaft, wherein the supporting mechanism unit has a frame (31), a spherical bearing (33) and a deflection adjusting unit (35), wherein the shaft is supported by the frame via the spherical bearing, an end portion (32) of the supporting shaft is passed through the spherical bearing and is extended, and a position of an end of the end portion in vertical direction is adjusted by the deflection adjusting unit.

5 Claims, 5 Drawing Sheets

(51) Int. Cl.
*G01B 21/14* (2006.01)
*G01B 11/12* (2006.01)

(56) References Cited

U.S. PATENT DOCUMENTS

| | | |
|---|---|---|
| 2,822,620 A | 2/1958 | Ulfeldt |
| 3,247,732 A | 4/1966 | Barnhart |
| 3,436,967 A | 4/1969 | Post |
| 3,771,350 A | 11/1973 | Romans |
| 4,045,877 A | 9/1977 | Rutter |
| 4,382,338 A | 5/1983 | Possati et al. |
| 4,536,963 A | 8/1985 | Yamamoto et al. |
| 4,631,834 A | 12/1986 | Hayashi et al. |
| 4,872,269 A | 10/1989 | Sattmann |
| 4,937,524 A | 6/1990 | Fasnacht et al. |
| 4,967,092 A | 10/1990 | Fraignier et al. |
| 5,083,384 A | 1/1992 | Possati et al. |
| 5,095,634 A | 3/1992 | Overlach et al. |
| 5,224,274 A | 7/1993 | Blaiklock |
| 5,259,119 A * | 11/1993 | Yoshioka ............... G01B 5/12 33/502 |
| 5,808,250 A | 9/1998 | Torii et al. |
| 5,933,231 A | 8/1999 | Bieman et al. |
| 6,243,962 B1 | 6/2001 | Brock |
| 6,249,007 B1 | 6/2001 | Gooch et al. |
| 6,427,353 B1 * | 8/2002 | Nelson ............... G01B 5/00 33/542 |
| 6,931,149 B2 | 8/2005 | Hagene et al. |
| 3,033,032 A1 | 1/2010 | Fujikawa et al. |
| 8,841,603 B1 | 9/2014 | Blanton et al. |
| 8,842,297 B2 | 9/2014 | Størksen et al. |
| 9,145,924 B2 | 9/2015 | Baba et al. |
| 2003/0198374 A1 | 10/2003 | Hagene et al. |
| 2004/0114793 A1 | 6/2004 | Bondurant |
| 2006/0044089 A1 | 3/2006 | Kang et al. |
| 2006/0112577 A1 | 6/2006 | Jones |
| 2006/0283037 A1 * | 12/2006 | Galle ............... G01B 5/08 33/783 |
| 2008/0105067 A1 | 5/2008 | Frey |
| 2009/0144999 A1 | 6/2009 | Lau |
| 2010/0005676 A1 * | 1/2010 | Fujikawa ............... G01B 5/12 33/542 |
| 2010/0060904 A1 | 3/2010 | Keightley et al. |
| 2010/0110448 A1 | 5/2010 | Johnson |
| 2011/0080588 A1 * | 4/2011 | Segall ............... G01N 21/954 356/445 |
| 2015/0000465 A1 | 1/2015 | Baba et al. |
| 2015/0002836 A1 | 1/2015 | Baba et al. |
| 2015/0007440 A1 * | 1/2015 | Baba ............... G01B 5/12 33/542 |
| 2015/0009322 A1 | 1/2015 | Baba et al. |
| 2015/0015695 A1 | 1/2015 | Baba et al. |
| 2015/0015873 A1 * | 1/2015 | Baba ............... G02B 23/2476 356/153 |
| 2015/0020395 A1 * | 1/2015 | Baba ............... G01B 21/14 33/544.4 |
| 2015/0131109 A1 * | 5/2015 | Baba ............... G01B 11/272 356/635 |

FOREIGN PATENT DOCUMENTS

| | | |
|---|---|---|
| EP | 1434076 A1 | 6/2004 |
| EP | 2818825 A1 | 12/2014 |
| FR | 2730304 A1 | 8/1996 |
| GB | 1388475 A | 3/1975 |
| JP | 50-159355 A | 12/1975 |
| JP | 57-22501 A | 2/1982 |
| JP | 58-66809 A | 4/1983 |
| JP | 59-187155 A | 10/1984 |
| JP | 61-144551 A | 7/1986 |
| JP | 61-282659 A | 12/1986 |
| JP | 63-55441 A | 3/1988 |
| JP | 63-159708 A | 7/1988 |
| JP | 1-195309 A | 8/1989 |
| JP | 3-502491 A | 6/1991 |
| JP | 5-62573 A | 3/1993 |
| JP | 7-55426 A | 3/1995 |
| JP | 7-29405 U | 6/1995 |
| JP | 7-191269 A | 7/1995 |
| JP | 8-14874 A | 1/1996 |
| JP | 8-93876 A | 4/1996 |
| JP | 9-311034 A | 12/1997 |
| JP | 10-137962 A | 5/1998 |
| JP | 10-197215 A | 7/1998 |
| JP | 10-213404 A | 8/1998 |
| JP | 2000-136923 A | 5/2000 |
| JP | 2000-146564 A | 5/2000 |
| JP | 2002-22671 A | 1/2002 |
| JP | 2002-148036 A | 5/2002 |
| JP | 2003-139525 A | 5/2003 |
| JP | 2003-329606 A | 11/2003 |
| JP | 2004-176852 A | 6/2004 |
| JP | 3105724 U | 11/2004 |
| JP | 2005-315814 A | 11/2005 |
| JP | 2005-331333 A | 12/2005 |
| JP | 2006-153546 A | 6/2006 |
| JP | 2006-156138 A | 6/2006 |
| JP | 2006-229551 A | 8/2006 |
| JP | 2006-234525 A | 9/2006 |
| JP | 2007-57305 A | 3/2007 |
| JP | 2007-71852 A | 3/2007 |
| JP | 2007-248465 A | 9/2007 |
| JP | 2007-292699 A | 11/2007 |
| JP | 4230408 B2 | 2/2009 |
| JP | 2010-164334 A | 7/2010 |
| JP | 2011-2439 A | 1/2011 |
| JP | 2011-13060 A | 1/2011 |
| WO | 97/02480 A1 | 1/1997 |
| WO | 2007051332 A2 | 5/2007 |
| WO | 2009152851 A1 | 12/2009 |
| WO | 2013/118918 A1 | 8/2013 |

OTHER PUBLICATIONS

International Preliminary Report on Patentablility mailed Aug. 21, 2014 in co-pending PCT application No. PCT/JP2013/053589.
International Search Report and Written Opinion mailed Apr. 2, 2013 in co-pending PCT application No. PCT/JP2013/053590.
International Preliminary Report on Patentability mailed Aug. 21, 2014 in co-pending PCT application No. PCT/JP2013/053590.
International Search Report and Written Opinion mailed Apr. 23, 2013 in co-pending PCT application No. PCT/JP2013/053591.
International Preliminary Report on Patentability mailed Aug. 21, 2014 in co-pending PCT application No. PCT/JP2013/053591.
International Search Report and Written Opinion mailed May 7, 2013 in co-pending PCT application No. PCT/JP2013/053592.
International Preliminary Report on Patentability mailed Aug. 21, 2014 in co-pending PCT application No. PCT/JP2013/053592.
International Search Report and Written Opinion mailed Mar. 12, 2013 in co-pending PCT application No. PCT/JP2013/053599.
International Preliminary Report on Patentability mailed Aug. 21, 2014 in co-pending PCT application No. PCT/JP2013/053599.
International Search Report and Written Opinion mailed May 7, 2013 in co-pending PCT application No. PCT/JP2013/053597.
International Preliminary Report on Patentability mailed Aug. 21, 2014 in co-pending PCT application No. PCT/JP2013/053597.
International Search Report and Written Opinion mailed Apr. 16, 2013 in corresponding PCT application No. PCT/JP2013/053598.
International Preliminary Report on Patentability mailed Aug. 21, 2014 in corresponding PCT application No. PCT/JP2013/053598.
International Search Report and Written Opinion mailed Apr. 2, 2013 in co-pending PCT application No. PCT/JP2013/0535603.
International Preliminary Report on Patentability mailed Aug. 21, 2014 in co-pending PCT application No. PCT/JP2013/053603.
European communication dated Oct. 7, 2015 in co-pending European patent application No. 13747245.2.
European communication dated Sep. 9, 2015 in co-pending European patent application No. 13746053.1.
European communication dated Nov. 11, 2015 in corresponding European patent application No. 13746339.4.

(56) References Cited

OTHER PUBLICATIONS

European communication dated Oct. 8, 2015 in co-pending European patent application No. 13746993.8.
Office action mailed Dec. 1, 2015 in co-pending U.S. Appl. No. 14/377,227.
European communication dated Sep. 9, 2015 in co-pending European patent application No. 13746779.1.
Office action mailed Sep. 1, 2015 in co-pending U.S. Appl. No. 14/377,328.
European communication dated Sep. 4, 2015 in co-pending European patent application No. 13747139.7.
European communication dated Sep. 18, 2015 in co-pending European patent application No. 13746866.6.
European communication dated Sep. 14, 2015 in co-pending European patent application No. 13746596.9.
Office Action mailed Mar. 25, 2015 in co-pending U.S. Appl. No. 14/377,225.
Notice of Allowance mailed Jul. 13, 2015 in co-pending U.S. Appl. No. 14/377,225.
Final rejection mailed Dec. 29, 2015 in co-pending U.S. Appl. No. 14/377,238.
Office action mailed Mar. 22, 2016 in co-pending U.S. Appl. No. 14/377,238.
Notice of Allowance mailed Feb. 16, 2016 in co-pending U.S. Appl. No. 14/377,237.
Notice of Allowance mailed Mar. 1, 2016 in co-pending U.S. Appl. No. 14/377,237.
Notice of Allowance mailed Mar. 30, 2016 in co-pending U.S. Appl. No. 14/377,227.
Office action mailed Apr. 18, 2016 in co-pending U.S. Appl. No. 14/377,230.
Notice of Allowance mailed Jun. 2, 2016 in co-pending U.S. Appl. No. 14/377,238.

* cited by examiner

INNER DIAMETER MEASURING DEVICE

TECHNICAL FIELD

The present invention relates to an inner diameter measuring device for measuring an inner diameter of a hollow member—in particular, a hollow member with longer length.

BACKGROUND ART

As a device for measuring an inner diameter of a hollow member or a hollow shaft, a device disclosed in the Patent Document 1 is known, for instance.

In the Patent Document 1, an inner diameter measuring device is disclosed, which comprises a main body supporting unit, being able to run through interior of a pipe, a main body unit supported on the main body supporting unit, and an inner diameter measuring unit installed on the main body unit.

The inner diameter measuring device disclosed in the Patent Document 1 is to measure interior portion of a pipe, i.e. to measure inner surface by running along an inner surface of the pipe. In a case where there is a step or surface irregularities on the inner surface, the inner diameter measuring device may not be able to run, or a decentering may occur on the inner diameter measuring unit due to shock caused when the inner diameter measuring unit moves over the step or surface irregularities, thereby causing problems such as decrease of measurement accuracy.

Also, in the Patent Document 2, an optical inspecting device for inspecting inner wall of a tubular product is disclosed, which comprises a tubular casing supported at the center of a pipe by an aligning device used as a guide to inspect inner surface of a pipe, an optical system installed inside the tubular casing and used for projecting laser beams over total circumference, and an electronic camera for taking an image of an optical ring, which is formed when the laser beams are projected to an inner surface of the pipe, and performing image processing of the optical ring photographed by the electronic camera.

The optical inspecting device of the Patent Document 2 also performs aligning by using an inner surface of the pipe as a guide and moves along the inner surface. There have been problems in that the device cannot run where there is a step or surface irregularities, or decentering may occur and measurement accuracy is decreased.

To solve the problems as described above, it is an object of the present invention to provide an inner diameter measuring device, which can support the inner diameter measuring unit without being brought into contact with inner surface of the hollow portion, being able to perform inner diameter measurement correctly regardless of a shape or a property of the inner surface of the pipe and, moreover, able to perform inner diameter measurement even in case an object to be measured has longer length.

CONVENTIONAL ART REFERENCES

Patent Document 1: JP-A-2011-13060
Patent Document 2: JP-A-H10-197215

DISCLOSURE OF THE INVENTION

The present invention relates to an inner diameter measuring device for measuring an inner diameter by inserting an inner diameter measuring unit into an inside of a hollow member to be measured, comprising a supporting shaft having the inner diameter measuring unit supported at a forward end, and a supporting mechanism unit for cantilever-supporting the supporting shaft, wherein the supporting mechanism unit has a frame, a spherical bearing and a deflection adjusting unit, wherein the shaft is supported by the frame via the spherical bearing, an end portion of the supporting shaft is passed through the spherical bearing and is extended, and a position of an end of the end portion in vertical direction is adjusted by the deflection adjusting unit.

Further, the present invention relates to the inner diameter measuring device, wherein the frame has a front surface base plate positioned at a forward end side of the supporting shaft and a rear surface base plate installed at a position separated by a predetermined distance with respect to the front surface base plate, wherein the spherical bearing is mounted on the front surface base plate, the deflection adjusting unit is mounted on the rear surface base plate via a horizontal adjusting unit, and the horizontal adjusting unit can adjust a position of the deflection adjusting unit in horizontal direction.

Further, the present invention relates to the inner diameter measuring device, wherein the deflection adjusting unit has a vertical guide block extended in vertical direction and a nut block provided above an end portion of the supporting shaft, wherein an end of the end portion is sandwiched by the vertical guide block and is displaceable only in vertical direction along the vertical guide block, a lower end of a deflection adjusting screw screwed through the nut block comes into contact with an upper end of the end, a position in vertical direction of the end is adjusted by the deflection adjusting screw and inserted into the vertical guide block, an end fixing screw movable in up-to-down direction is screwed into the end, and the end is fixed on the vertical guide block by the end fixing screw.

Further, the present invention relates to the inner diameter measuring device, wherein the horizontal adjusting unit has a horizontal position adjusting plate being displaceable in horizontal direction with respect to the rear surface base plate and being fixable, and a vertical guide block and a nut block are mounted on the horizontal position adjusting plate.

BRIEF DESCRIPTION OF THE DRAWINGS

FIG. 2A, FIG. 2B and FIG. 2C are explanatory drawings to show a cantilever-supported condition of an inner diameter measuring unit in the inner diameter measuring device, where

BEST MODE FOR CARRYING OUT THE INVENTION

Description will be given below on an embodiment of the present invention by referring to the drawings.

First, description will be given below on general features of an embodiment of the present invention by referring to FIG. 1.

Figure 1:
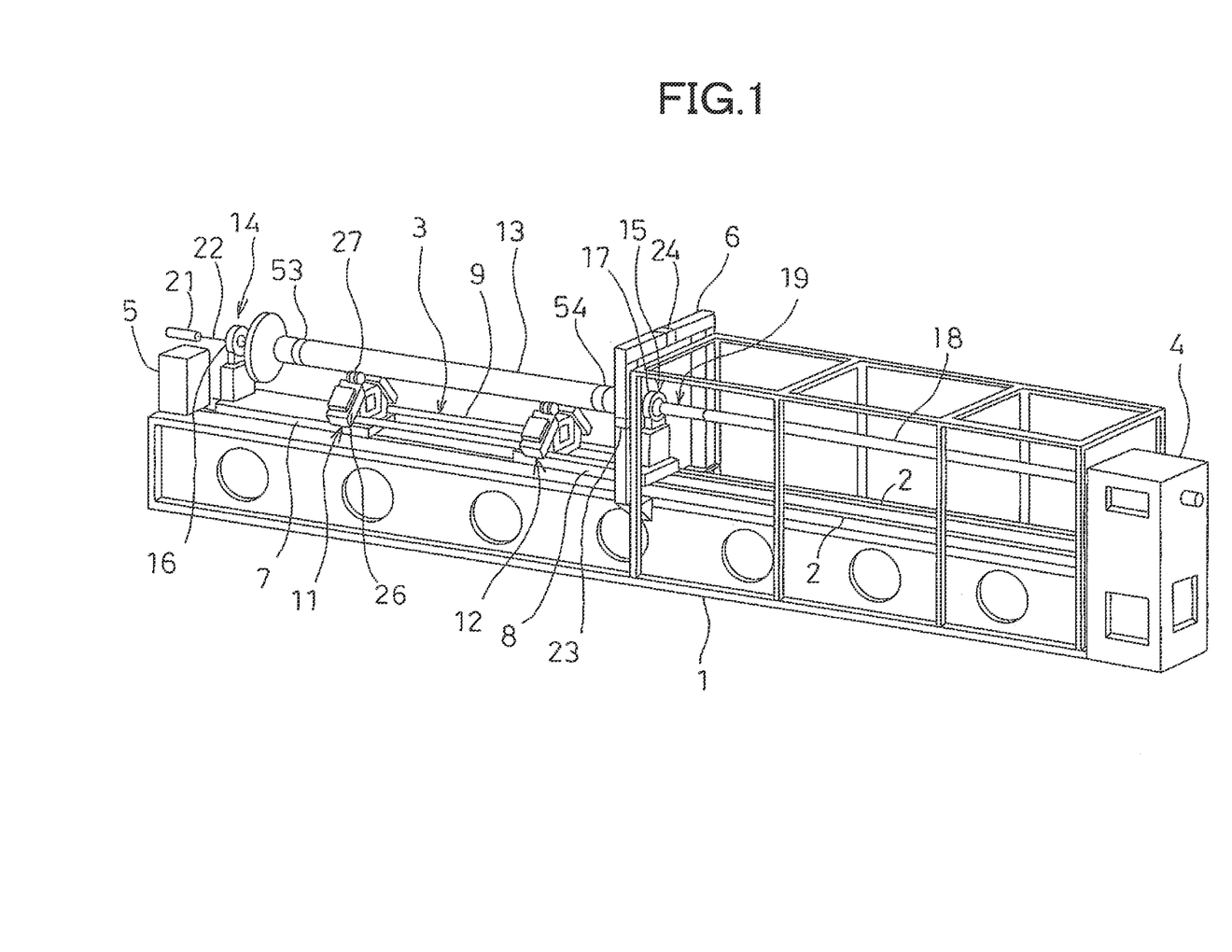
FIG. 1 is an overall perspective view to show one example of an inner diameter measuring device, for which the present invention is applied.

In FIG. 1, reference numeral 1 denotes a bed. A rail 2 is laid on an upper surface of the bed 1. An object to be measured supporting carriage 3 is laid on the rail 2, and the object to be measured supporting carriage 3 is arranged as movable along the rail 2. A position in moving direction of the object to be measured supporting carriage 3 is measured by a linear scale provided along the rail 2 or by a measuring device or by a scale separately prepared.

A measuring device main unit 4 is disposed on a base end (shown at the right end in FIG. 1) of the bed 1. A reference guide laser device 5 is mounted on an upper surface of the bed 1. Approximately at the center of the bed 1, a portal type centering laser device 6 is installed so as to stride over the bed 1. It is to be noted that the installing position of the centering laser device 6 is preferably at about the center of the bed 1 but is arbitrary if the installing position is a position where outer diameter reference surfaces 53 and 54 of a pipe to be measured 13 can be measured as to be described later.

The object to be measured supporting carriage 3 has a forward end slider 7 and a base end slider 8 being slidably placed on the rail 2, and the forward end slider 7 and the base end slider 8 are connected by a connecting rod 9 with its length adjustable.

Pipe holding units 11 and 12 are arranged on the forward end slider 7 and the base end slider 8 respectively, and the pipe to be measured 13, i.e. a hollow object to be measured with longer length, is placed on the pipe holding units 11 and 12 so as to span over the pipe holding units 11 and 12. The pipe holding units 11 and 12 are designed to have the same structure.

In this case, the pipe to be measured 13 is a long object with axial length of about 3000 mm and with a diameter of about 70 to 150 mm ($\phi$).

The pipe holding unit 11 has a pair of sliders 26 and 26, which are positioned opposite to each other and are arranged symmetrically with respect to the vertical line. The sliders 26 are arranged so that the slides slide is inclining at a predetermined angle, inclining at 45°, for instance. On an upper end of each of the sliders 26, a freely rotatable roller 27 is provided, and the pipe to be measured 13 is placed on two rollers 27 and 27.

It is so arranged that the sliders 26 and 26 are moved up and down respectively by motors (not shown) so that the position can be controlled. For instance, when the sliders 26 are moved up or down at the same time, position of the pipe to be measured 13 in vertical direction can be adjusted. By moving either one of them up or down, the position of the pipe to be measured 13 in horizontal direction can be adjusted.

At a forward end of the forward end slider 7, a first reference jig unit 14 is erected, and a second reference jig unit 15 is erected at a base end of the base end slider 8. On each of the first reference jig unit 14 and the second reference jig unit 15, a reference ring 16 and a reference ring 17 are provided respectively. Both outer diameter and inner diameter of the reference ring 16 and 17 are prepared with high precision. The reference rings 16 and 17 are measured in advance, and outer diameter and inner diameter have values already known.

The measuring device main unit 4 has a supporting mechanism unit (to be described later) and a control device (not shown).

From the measuring device main unit 4, a long supporting shaft 18, which is cantilever-supported on the supporting mechanism unit, is extended in horizontal direction and toward the forward end, and an inner diameter measuring unit 19 is mounted on a forward end of the supporting shaft 18. To correspond to the pipe to be measured 13, the supporting shaft 18 has axial length of about 3000 mm and a diameter of about 50 to 130 mm ($\phi$).

The supporting shaft 18 is designed as hollow, and cables or the like (not shown) connected to the inner diameter measuring unit 19 is passed through an inside of the supporting shaft 18 and are connected to the control device of the measuring device main unit 4.

The control device performs driving control of a motor of the slider 26 and also performs moving control of the object to be measured supporting carriage 3. A signal obtained at the inner diameter measuring unit 19 is inputted to the control device. Based on the signal from the inner diameter measuring unit 19, a processing as required such as calculation, image processing, etc. are carried out and the measurement is performed.

The inner diameter measuring unit 19 is a contact type or a non-contact type inner diameter measuring unit. The contact type inner diameter measuring unit and the non-contact type inner diameter measuring unit are designed to be attachable to or detachable from the forward end of the supporting shaft 18. Depending on the measuring condition, either the contact type inner diameter measuring unit or the non-contact type inner diameter measuring unit is mounted, or both of the contact type inner diameter measuring unit and the non-contact type inner diameter measuring unit are mounted.

Any type of the measuring unit can be used as the contact type inner diameter measuring unit or as the non-contact type inner diameter measuring unit. As restriction on shape, the measuring unit is designed in a shape, which can be accommodated with a cylindrical surface having the same diameter as that of the supporting shaft 18.

The reference guide laser device 5 has a laser emitter 21. The laser emitter 21 is installed so that optical axis runs in horizontal direction, and a laser beam 22 is emitted in horizontal direction from the laser emitter 21. The laser beam 22 will be a reference line of the inner diameter measuring device, and the pipe to be measured 13, the reference rings 16 and 17, and the supporting shaft 18 are arranged to run concentrically along the optical axis of the laser beam 22.

The centering laser device 6 has a horizontal laser distance measuring unit 23 for measuring a distance in horizontal direction and a vertical laser distance measuring unit 24 for measuring a distance in vertical direction. The horizontal laser distance measuring unit 23 and the vertical laser distance measuring unit 24 are set up so that the distance measuring light optical axis of the horizontal laser distance measuring unit 23 and the distance measuring light optical axis of the vertical laser distance measuring unit 24 cross each other on the laser beam 22.

The inner diameter measuring unit 19 has a measuring instrument (not shown) for measuring inner diameter of the pipe to be measured under the condition where the inner diameter measuring unit 19 is inserted into the pipe to be measured 13.

As the measuring instrument, a contact type inner diameter measuring instrument or a non-contact type inner diameter measuring instrument is used. As the contact type, an electric micrometer is used, for instance. The electric micrometer is moved in radial direction, and a probe of the electric micrometer is brought into contact with inner surface of the pipe to be measured 13, and inner diameter is measured according to displacement of the probe. In the case of the non-contact type, the laser beam is projected over total circumference, and an optical ring is formed on inner surface of the pipe to be measured 13, and an image of the optical ring or the like is taken by an image pickup device such as CCD camera. Based on the image data thus obtained, an inner diameter is determined by image processing according to shape of the optical ring on the image. Or, a combination of the contact type inner diameter measuring unit and a non-contact type inner diameter measuring unit may be used.

The inner diameter measuring unit 19 is cantilever-supported by the supporting shaft 18. Further, for the purpose of measuring a longer pipe to be measured 13 over total length, the supporting shaft 18 is also designed to be longer. For this reason, it is inevitable that the supporting shaft is bent even when it is so arranged that the supporting shaft 18 has sufficient rigidity to stably support the inner diameter measuring unit 19, because the supporting shaft 18 has longer length.

In the inner diameter measuring device, it is designed that the inner diameter measuring unit 19 is fixed and the pipe to be measured 13 can be moved, therefore it would suffice if a position and a posture of the inner diameter measuring unit 19 are designed with such accuracy as to be needed for the measurement. For this reason, a supporting mechanism unit of the supporting shaft 18 supports the supporting shaft 18 and corrects so that an axis of the inner diameter measuring unit 19 coincides with the laser beam 22 (reference line) and runs in horizontal direction.

Figure 2A:
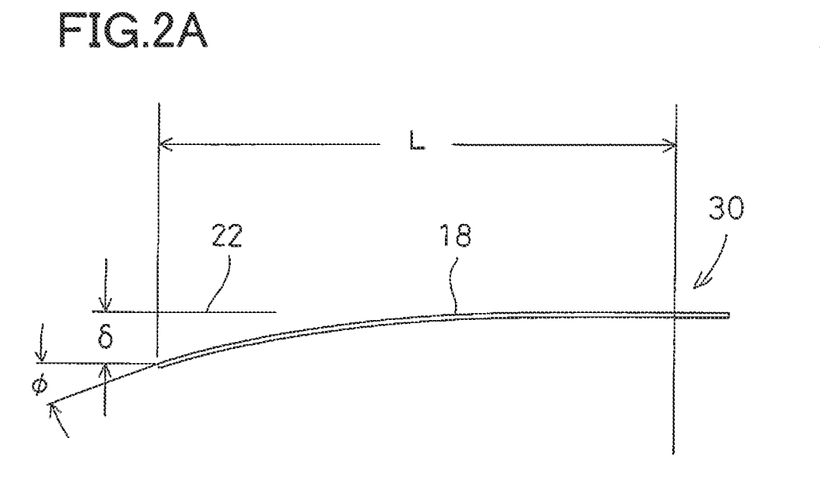
FIG. 2A is a drawing to explain a case where deflection and deflection angle are not corrected.
Figure 2B:
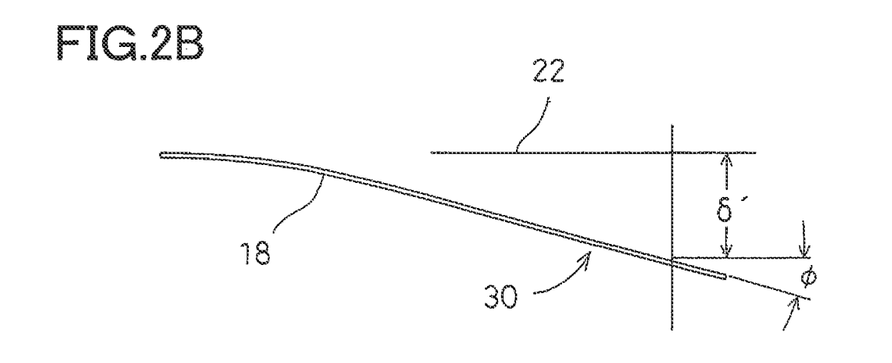
FIG. 2B is a drawing to explain a case where deflection and deflection angle are corrected.
Figure 2C:
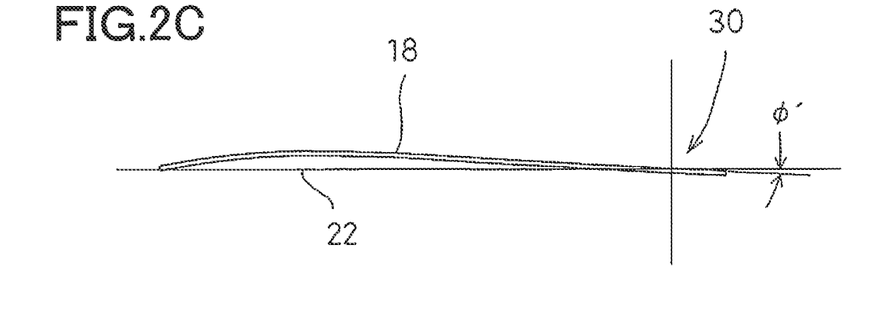
FIG. 2C is a drawing to explain a case where deflection is corrected.

Referring to FIG. 2, description will be given on the supporting mechanism unit 30 of the supporting shaft 18.

FIG. 2A shows a condition where the supporting shaft 18 is cantilever-supported. A forward end of the supporting shaft 18 is bent at a deflection of δ and is tilted at a deflection angle of φ. That is, the forward end of the supporting shaft 18 is displaced downward by δ with respect to the reference line (the laser beam 22), and also, the forward end of the supporting shaft 18 is tilted at an angle of φ counterclockwise with respect to the laser beam 22. Therefore, as shown in FIG. 2B, in order to ensure that the forward end is in a horizontal position (i.e. tilt angle=0) and the displacement with respect to the laser beam 22 will be zero, it can be arranged that the supporting shaft 18 is inclined clockwise by an angle of φ on the supporting mechanism unit side and further is displaced downward by an amount of δ' with respect to the laser beam 22 so that the forward end coincide with the laser beam 22. To find out whether the forward end is aligned with the laser beam 22 or not, it should be confirmed that the laser beam 22 is projected to the center of the forward end surface of the supporting shaft 18.

In FIG. 2A and FIG. 2B, it is drawn rather in exaggerated manner so that the deflection condition can be easily understood. In a case where the supporting shaft 18 has rigidity as a strong member as in the case of the present embodiment, the deflection angle δ is slight. Therefore, the forward end is aligned with the laser beam 22 simply by the rotation of the supporting unit and without giving displacement in downward direction as shown in FIG. 2C. In this case, the deflection angle cannot be corrected perfectly, but there is practically no problem because the deflection angle itself is very small. In a case where the deflection of the forward end is to be corrected simply by the rotation of the supporting unit, the rotation angle φ' of the supporting unit may be as low as: $\phi'=\tan^{-1} \delta/L$ (where L represents axial length of the supporting shaft 18).

Figure 3:
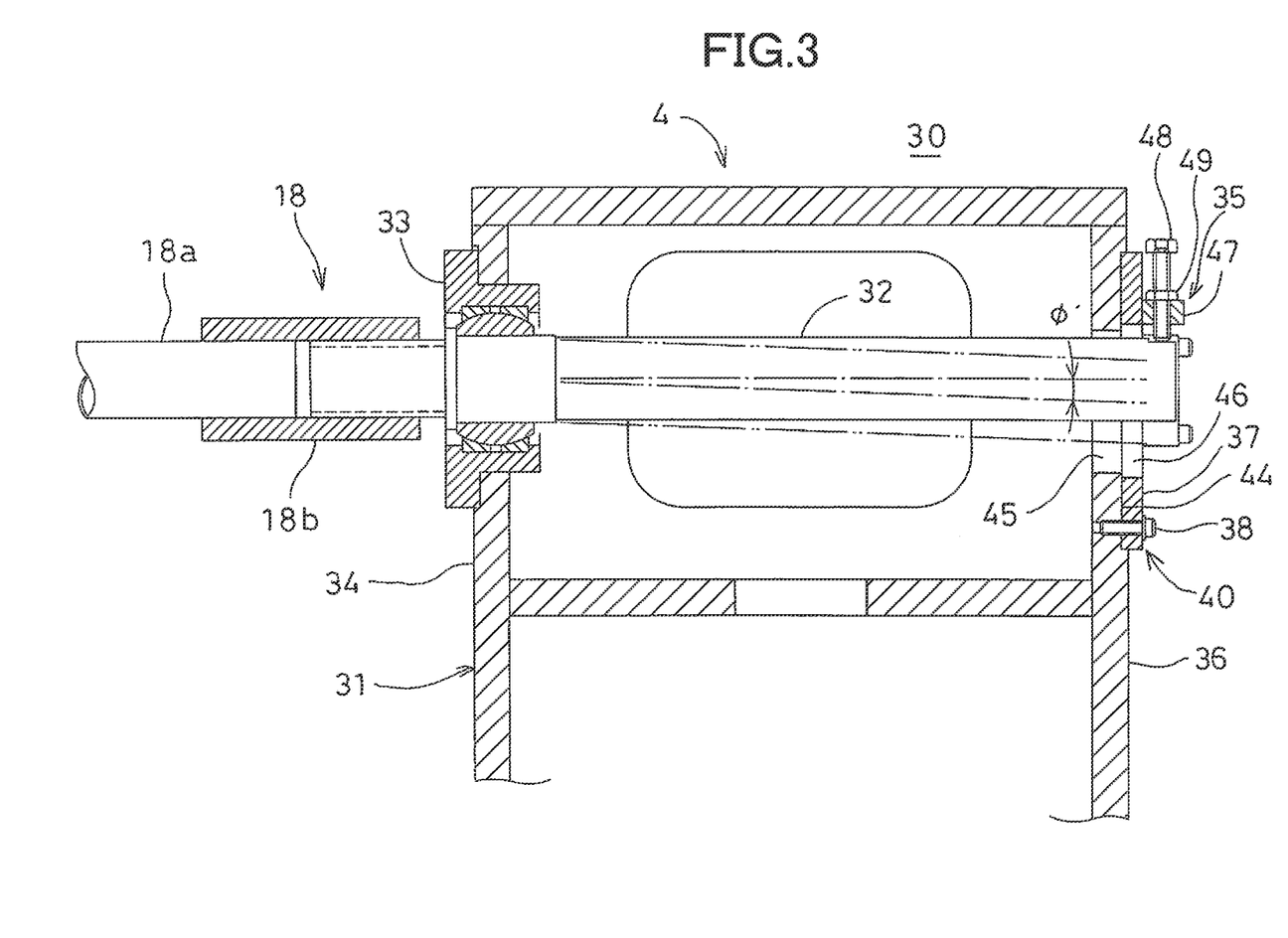
FIG. 3 is a cross-sectional view of an essential portion of an embodiment of the present invention.
Figure 4:
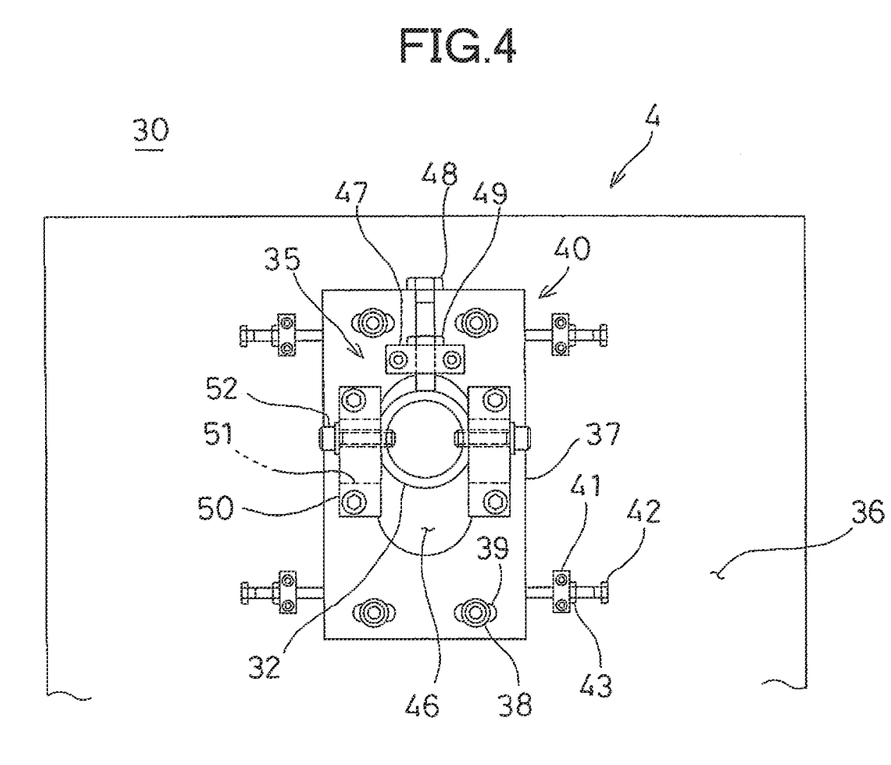
FIG. 4 is a side view of the embodiment.

FIG. 3 and FIG. 4 each represents an example of the supporting mechanism unit 30 of the supporting shaft 18, and the supporting mechanism unit 30 is provided on an upper part of the measuring device main unit 4. The supporting shaft 18 is so arranged that a shaft main element 18a and a shaft end portion 32 are connected together by a joint 18b.

In FIG. 3, a reference numeral 31 denotes a box-type frame made of a strong member, and the frame 31 has a front surface base plate 34, and a rear surface base plate 36 which is mounted at a predetermined distance in horizontal direction with respect to the front surface base plate 34.

The shaft end portion 32 is disposed so that the shaft end portion 32 passes through the frame 31 in horizontal direction. A forward end of the shaft end portion 32 is supported by the front surface base plate 34 of the frame 31 via a spherical bearing 33 and the shaft end portion 32 is rotatable in all directions within a predetermined range with the spherical bearing 33 as the center.

A base end of the shaft end portion 32 passes through the rear surface base plate 36 of the frame 31 and is supported on the rear surface base plate 36 via a deflection adjusting unit 35 and a horizontal adjusting unit 40. The deflection adjusting unit 35 is mounted on the rear surface base plate 36 via the horizontal adjusting unit 40.

First, description will be given on the horizontal adjusting unit 40.

On a rear surface of the rear surface base plate 36 (on right side in FIG. 3), a horizontal position adjusting plate 37 in rectangular shape is arranged, and the horizontal position adjusting plate 37 is fixed on the rear surface base plate 36 by bolts 38 at four points. A hole 39, where the bolt 38 passes through the horizontal position adjusting plate 37, is designed as a long hole, which is longer in horizontal direction. Under the condition that the bolt 38 is loosened, the position of the horizontal position adjusting plate 37 can be adjusted by an allowance between the bolt 38 and the hole 39.

At positions opposite to the two vertical side surface extending in vertical direction of the horizontal position adjusting plate 37, two nut blocks 41 are disposed each on each of the vertical side surfaces respectively, and the nut blocks 41 are fixed on the rear surface base plate 36. A horizontal adjusting bolt 42 passes through each of the nut blocks 41 in horizontal direction, and the horizontal adjusting bolts 42 comes into contact perpendicularly with the vertical side surface of the horizontal position adjusting plate 37.

Therefore, by adjusting four horizontal adjusting bolts 42, the position of the horizontal position adjusting plate 37 in horizontal direction can be adjusted. For instance, when the horizontal adjusting bolt 42 on left side (on the left side in FIG. 4) is loosened with respect to the horizontal position adjusting plate 37 and the horizontal adjusting bolt 42 on the right side is fastened, the horizontal position adjusting plate 37 is displace leftward. After the position adjustment, the bolt 38 is fastened, and the horizontal position adjusting plate 37 is fixed on the rear surface base plate 36. Further, the horizontal adjusting bolt 42 is fixed by a lock nut 43.

A counterbore part 44 is prepared on the rear surface base plate 36. The horizontal position adjusting plate 37 is fitted into the counterbore part 44, and the horizontal position adjusting plate 37 can be displaced only in the horizontal direction with respect to the rear surface base plate 36.

On the rear surface base plate 36 where the shaft end portion 32 passes through, a hole 45 is prepared, and the hole 45 has a larger diameter than a diameter of the shaft end portion 32 so that the shaft end portion can be adjusted in horizontal and vertical directions. Further, a hole 46 is prepared in the horizontal position adjusting plate 37 where the shaft end portion 32 passes through. The hole 46 is designed as a hole, which is long in vertical direction, and the hole 46 is a long hole longer in vertical direction than the hole 45.

Next, description will be given on the deflection adjusting unit 35.

A nut block 47 is fixed on the horizontal position adjusting plate 37 so that the nut block is positioned on an upper end of the hole 46. A deflection adjusting screw 48 is engaged with the nut block 47, and the deflection adjusting screw 48 passes through the nut block 47 in vertical direction. It is set in such a manner that axis of the deflection adjusting screw 48 passes through the center of the shaft end portion 32, and a lower end of the deflection adjusting screw 48 comes into contact with an upper end surface of the shaft end portion 32. The deflection adjusting screw 48 is fixed by a lock nut 49 after adjustment.

On both sides of the hole 46, vertical guide blocks 50 and 50 extending in vertical direction are fixed respectively on the horizontal position adjusting plate 37. The vertical guide block 50 comes into contact with an end of the shaft end portion 32 from lateral direction. The end of the shaft end portion 32 is sandwiched by the vertical guide blocks 50 and 50 and can be displaced only in vertical direction along the vertical guide blocks 50 and 50.

On each of the vertical guide blocks 50, a long hole 51 longer in vertical direction is formed. An end fixing screw 52 passes through the long hole 51 from horizontal direction, and the end fixing screw 52 is engaged with an end of the shaft end portion 32. By fastening the end fixing screw 52, an end of the shaft end portion 32 is fixed on the horizontal position adjusting plate 37 via the vertical guide block 50.

As described above, the shaft end portion 32 is so designed that the shaft end portion can be rotated in all directions around the spherical bearing 33 as the center.

When a horizontal position of the horizontal position adjusting plate 37 is adjusted by adjusting the horizontal adjusting bolts 52 at opposed positions, a displacement of the horizontal position adjusting plate 37 is transmitted to an end of the shaft end portion 32 via the vertical guide block 50. By the displacement of the end of the shaft end portion 32 in horizontal direction, the shaft end portion 32 and a shaft main element 18a connected to the shaft end portion 32 is integrally rotated in horizontal direction around the spherical bearing 33 as the center. By the rotation of the shaft main element 18a in horizontal direction, a position in horizontal direction of the inner diameter measuring unit 19 mounted at the forward end of the shaft main element 18a is adjusted.

After the completion of adjustment of the horizontal position of the horizontal position adjusting plate 37, i.e. when the horizontal position of the inner diameter measuring unit 19 is adjusted, the horizontal position adjusting plate 37 is fixed at the horizontal position by means of the bolt 38.

Next, a position of the end of the shaft end portion 32 in vertical direction is adjusted by the deflection adjusting screw 48. By adjustment of the position of the end of the shaft end portion 32 in vertical direction, the shaft end portion 32 is rotated in vertical direction around the spherical bearing 33. Also, the shaft main element 18a is integrally rotated in vertical direction with the shaft end portion 32, and a position in vertical direction of the inner diameter measuring unit 19 of the forward end of the shaft main element 18a is adjusted. When the position in vertical direction of the inner diameter measuring unit 19 is adjusted, the position in vertical direction of the end of the shaft end portion 32 is fixed by the end fixing screw 52.

Margin for adjustment of the horizontal adjusting bolt 42 is set to such a value as to be sufficiently able to absorb assembling error in assembling of the object to be measured supporting carriage 3 and the rail 2. Margin for adjustment of the deflection adjusting screw 48 is set to a value sufficient enough for adjustment of the bending of the supporting shaft 18 and is determined by a distance between the front surface base plate 34 and the rear surface base plate 36, by length of the supporting shaft 18, and by rigidity of the supporting shaft 18, etc.

By the supporting mechanism unit 30, positions of the inner diameter measuring unit 19 in vertical and horizontal directions can be adjusted.

Description will be given below on operation of the inner diameter measuring unit according to the present embodiment.

First, as preparation prior to the adjusting of the measurement, the position of the inner diameter measuring unit 19 is adjusted. A judgment as to whether the positioning of the inner diameter measuring unit 19 has been finally determined or not, depends on the judgment as to whether the laser beam 22 is projected to the center of the forward end surface of the inner diameter measuring unit 19 or not. For the purpose of facilitating the judgment as to whether or not the laser beam 22 is projected toward the center of the forward end surface depends upon the judgment as to whether or not the laser beam is projected to the center of the forward end surface of the inner diameter measuring unit 19. Also, in order to facilitate the judgment as to whether or not the laser beam is projected to the center of the forward end surface, an index mark such as a cross mark or a small circle to show the center may be provided on the forward end surface of the inner diameter measuring unit 19.

A position adjustment of the inner diameter measuring unit 19 in horizontal direction is performed by adjusting the horizontal adjusting bolt 42 under the condition that the bolt 38 is loosened. Further, a positioning of the inner diameter measuring unit 19 in vertical direction, i.e. a positioning to correct the bending of the supporting shaft 18, is carried out by the deflection adjusting screw 48 under the condition that the end fixing screw 52 is loosened (See FIG. 2C).

When the horizontal positioning and the vertical positioning of the inner diameter measuring unit 19 have been completed, an adjustment of the object to be measured supporting carriage 3 is performed.

A length of the connection rod 9 is adjusted and a distance between the pipe holding unit 11 and the pipe holding unit 12 is adjusted to a condition, which is suitable for supporting the pipe to be measured 13.

The object to be measured supporting carriage 3 is moved and a reference ring 17 on the base end side is set to a measuring position of the centering laser device 6. Outer peripheral surface of the reference ring 17 is measured from two directions, i.e. in horizontal and vertical directions, and it is determined whether an axis of the reference ring 17 and an axis of the reference ring 16 coincides with the laser beam 22 or not.

Further, the object to be measured supporting carriage 3 is moved, and measurement is similarly carried out with respect to the reference ring 16 on the forward end side by the centering laser device 6. If both the axis of the reference ring 17 and the axis of the reference ring 16 coincide with the laser beam 22, it is certain that the object to be measured supporting carriage 3 is moving in a direction parallel to the laser beam 22. Then, it is confirmed that the object to be measured supporting carriage 3 is moving in a direction parallel to the laser beam 22. If the object to be measured supporting carriage is not running in a direction parallel to the laser beam 22, a position of the rail 2 or the like are adjusted.

The pipe to be measured 13 is placed on the pipe holding unit 11 and the pipe holding unit 12 and a centering of the pipe to be measured 13 is performed. That is, a position of the pipe to be measured 13 is adjusted so that the axis of the pipe to be measured 13 coincides with the laser beam 22.

On the pipe to be measured 13, outer diameter reference surfaces 53 and 54 prepared with high accuracy are set at least at two points of the forward end and the base end and the positions of the outer diameter reference surfaces 53 and 54 are measured by means of the centering laser device 6 and the centering of the pipe to be measured 13 is carried out.

First, the outer diameter reference surface 54 is moved to a measuring position of the centering laser device 6, and a position of the outer diameter reference surface 54 is measured by using the horizontal laser distance measuring unit 23 and the vertical laser distance measuring unit 24.

For the centering of the pipe to be measured 13 in horizontal direction, the vertical laser distance measuring unit 24 is used. Under the condition that the outer diameter reference surface 54 is measured by the vertical laser distance measuring unit 24, the pipe to be measured 13 is reciprocally moved in horizontal direction and in a direction perpendicularly crossing the axis by using the pipe holding units 11 and 12. When the measurement value of the vertical laser distance measuring unit 24 reaches minimum value, horizontal direction of the axis of the pipe to be measured 13 coincides with the laser beam 22.

Next, for the centering of the pipe to be measured 13 in vertical direction, the horizontal laser distance measuring unit 23 is used. Under the condition that the outer diameter reference surface 54 is measured by the horizontal laser distance measuring unit 23, the pipe to be measured 13 is moved up and down by using the pipe holding units 11 and 12. When the measured value of the horizontal laser distance measuring unit 23 reaches minimum value, it means that a vertical direction of the axis of the pipe to be measured 13 coincides with the laser beam 22.

The object to be measured supporting carriage 3 is moved, the outer diameter reference surface 53 is set at the measuring position of the centering laser device 6 and a centering of the outer diameter reference surface 53 is performed similarly to the case of the measurement of the outer diameter reference surface 54. The centering is performed at two points, i.e. at the forward end and at the base end of the pipe to be measured 13 and the centering of the entire pipe to be measured 13 is completed.

When the centering of the pipe to be measured 13 is completed, an inner diameter measurement by the inner diameter measuring unit 19 is carried out. By the fact that inner diameters of the reference ring 17 and the reference ring 16 are measured by the inner diameter measuring unit 19 in advance, a correlation between a known value and the result of measurement by the inner diameter measuring unit 19 can be obtained. When inner diameter of the pipe to be measured 13 is measured by the inner diameter measuring unit 19 based on this correlation, an absolute value (actual dimension) of the inner diameter of the pipe to be measured 13 can be acquired.

The object to be measured supporting carriage 3 is moved, and the inner diameter measuring unit 19 is gradually inserted into the pipe to be measured 13. Even under the condition that the inner diameter measuring unit 19 is inserted, the inner diameter measuring unit 19 is supported by the supporting shaft 18, and the inner diameter measuring unit 19 and the pipe to be measured 13 are maintained in non-contact condition.

Because a position in axial direction of the inner diameter measuring unit 19 is fixed, a position of the inner diameter measuring unit 19 in the pipe to be measured 13 can be specified by determining position and amount of moving of the object to be measured supporting carriage 3—that is, by determining the position and the amount of moving of the pipe to be measured 13 (i.e. position in axial direction).

An inner diameter is measured at a position in axial direction as specified by the inner diameter measuring unit 19, and the result of measurement is stored in the control device by associating with the position in axial direction.

The inner diameter measuring unit 19 is cantilever-supported by the long supporting shaft 18 and is in a condition easily vibrated. However, with respect to a measuring position, the pipe to be measured 13 is moved and the inner diameter measuring unit 19 is fixed and the inner diameter measuring unit 19 and the pipe to be measured 13 are maintained in non-contact condition with each other, thereby vibration during the moving does not exert influence on the inner diameter measuring unit 19 and the inner diameter measuring unit 19 is maintained in stable and standstill condition. Therefore, the measurement by the inner diameter measuring unit 19 is performed in stable condition.

Further, the inner diameter measuring unit 19 has a supporting method, in which bending of the supporting shaft is admitted. As far as the deflection amount of the supporting shaft 18 is within the range of difference between the outer diameter of the supporting shaft 18 and the inner diameter of the pipe to be measured 13, it does not matter how long the axial length of the supporting shaft 18 is, and the supporting shaft 18 with sufficient length can be used. Accordingly, an inner diameter of a pipe to be measured 13 with sufficient length can be determined.

If the position of the inner diameter measuring unit 19 in horizontal direction can be adjusted at the time of assembling, the horizontal position adjusting unit such as the horizontal position adjusting plate 37, the nut block 41, the horizontal adjusting bolt 42, etc. may be omitted.

It would suffice if the deflection adjusting unit 35 can displace an end portion of the shaft end portion 32 in vertical direction and can be fixed, and the deflection adjusting unit 35 is not limited to the deflection adjusting screw 48. For instance, an adjustment may be made by inserting spacer, shim, etc. between the nut block 47 and the shaft end portion 32.

Figure 5:
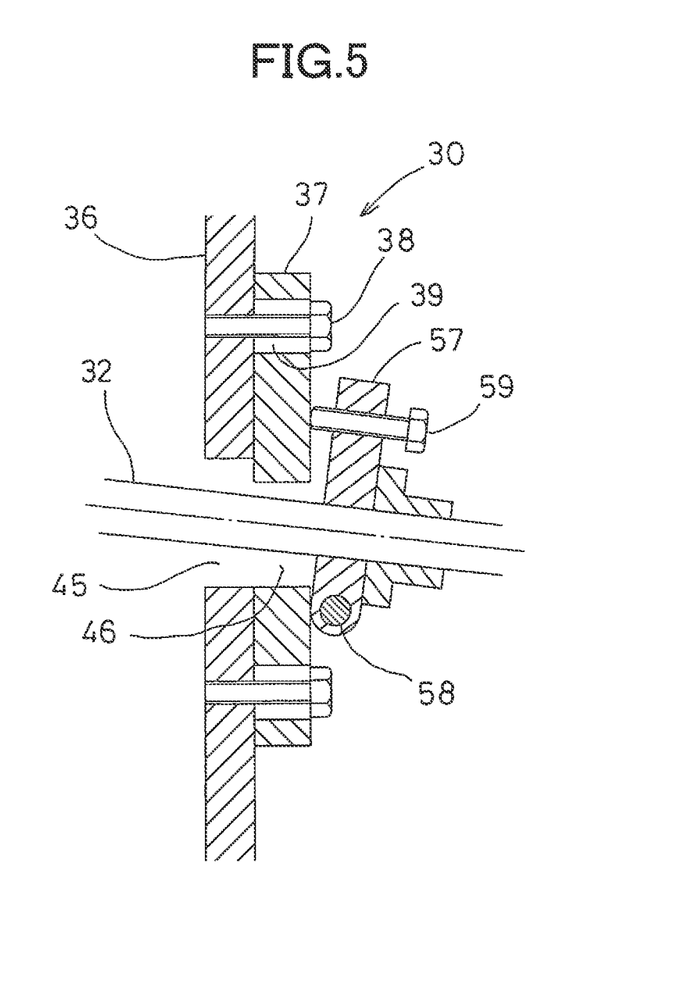
FIG. 5 is a cross-sectional view to show another example of a supporting mechanism unit.

FIG. 5 shows another example of the supporting mechanism unit 30. In FIG. 5, the same component as shown in FIG. 3 is referred by the same symbol.

A horizontal position adjusting plate 37 is fixed on a rear surface base plate 36 erected in vertical position. A hole where the bolt 38 is passed through is designed as a hole 39 long in horizontal direction, and mounting position in horizontal direction of the horizontal position adjusting plate 37 is designed to be adjustable in horizontal direction (See FIG. 4).

A lower end of a tilting plate 57 is pivotally attached on the horizontal position adjusting plate 37 via a horizontal axis 58, and the tilting plate 57 is designed to be rotatable around the horizontal axis 58. An end of the shaft end portion 32 is fixed on and supported by the tilting plate 57.

On an upper end of the tilting plate 57, a tilt adjusting screw 59 is screwed through and its forward end comes into contact with the horizontal position adjusting plate 37. When the tilt adjusting screw 59 is turned and its forward end is protruded from the tilting plate 57, the tilting plate 57 is tilted with the horizontal axis 58 as the center. It is so arranged that the forward end of the tilting plate 57 is fixed on the horizontal position adjusting plate 37 by a bolt (not shown). On the horizontal positioning adjusting plate 37, a hole 46 is formed so that no interference occurs when tilting of the supporting shaft 18 is adjusted.

In the supporting mechanism unit 30, too, the forward end of the supporting shaft 18 can be set at a position of the laser beam 22 by adjusting the tilting of the position of the horizontal position adjusting plate 37 in horizontal direction and by adjusting the tilting of the tilting plate 57.

INDUSTRIAL APPLICABILITY

According to the present invention, an inner diameter measuring device for measuring an inner diameter by inserting an inner diameter measuring unit into an inside of a hollow member to be measured, comprising a supporting shaft having the inner diameter measuring unit supported at a forward end, and a supporting mechanism unit for cantilever-supporting the supporting shaft, wherein the supporting mechanism unit has a frame, a spherical bearing and a deflection adjusting unit, wherein the shaft is supported by the frame via the spherical bearing, an end portion of the supporting shaft is passed through the spherical bearing and is extended, and a position of an end of the end portion in vertical direction is adjusted by the deflection adjusting unit. As a result, deflection caused when the inner diameter measuring unit is cantilever-supported can be corrected and the inner diameter measuring unit can be held at an appropriate position. Also, the inner diameter measuring unit can be inserted deep into the interior of a hollow member to be measured, and such superior effects can be realized that a member with longer length can be measured.

LEGEND OF REFERENCE NUMERALS

1 Bed
2 Rail
3 Object to be measured supporting carriage
4 Measuring device main unit
6 Centering laser device
11, 12 Pipe holding unit
13 Pipe to be measured
14 First reference jig unit
15 Second reference jig unit
16, 17 Reference ring
18 Supporting shaft
19 Inner diameter measuring unit
22 Laser beam
23 Horizontal laser distance measuring unit
24 Vertical laser distance measuring unit
30 Supporting mechanism unit
31 Frame
32 Shaft end portion
33 Spherical bearing
35 Deflection adjusting unit
37 Horizontal position adjusting plate
42 Horizontal adjusting bolt
43 Lock nut
47 Nut block
48 Deflection adjusting screw
50 Vertical guide block
52 End fixing screw

The invention claimed is:

1. An inner diameter measuring device for measuring an inner diameter by inserting an inner diameter measuring unit into an inside of a hollow member to be measured, comprising a supporting shaft having said inner diameter measuring unit supported at a forward end, and a supporting mechanism unit for cantilever-supporting said supporting shaft, wherein said supporting mechanism unit has a frame, a spherical bearing and a deflection adjusting unit, wherein said shaft is supported by said frame via said spherical bearing, an end portion of said supporting shaft is passed through said spherical bearing and is extended, a rotating angle of an end of said end portion in vertical direction is adjusted by said deflection adjusting unit, and a position of said inner diameter measuring unit in vertical direction is adjusted.

2. An inner diameter measuring device according to claim 1, wherein said frame has a front surface base plate positioned at a forward end side of said supporting shaft and a rear surface base plate installed at a position separated by a predetermined distance with respect to said front surface base plate, wherein said spherical bearing is mounted on said front surface base plate, said deflection adjusting unit is mounted on said rear surface base plate via a horizontal adjusting unit, and said horizontal adjusting unit can adjust a position of said deflection adjusting unit in horizontal direction.

3. An inner diameter measuring device according to claim 2, wherein said horizontal adjusting unit has a horizontal position adjusting plate being displaceable in horizontal direction with respect to said rear surface base plate and being fixable, and a vertical guide block and a nut block are mounted on said horizontal position adjusting plate.

4. An inner diameter measuring device according to claim 2, wherein said deflection adjusting unit has a vertical guide block extended in vertical direction and a nut block provided above an end portion of said supporting shaft, wherein an end of said end portion is sandwiched by said vertical guide block and is displaceable only in vertical direction along said vertical guide block, a lower end of a deflection adjusting screw screwed through said nut block comes into contact with an upper end of said end, a position in vertical direction of said end is adjusted by said deflection adjusting screw and inserted into said vertical guide block, an end fixing screw movable in up-to-down direction is screwed into said end, and said end is fixed on said vertical guide block by said end fixing screw.

5. An inner diameter measuring device according to claim 1, wherein said deflection adjusting unit has a vertical guide block extended in vertical direction and a nut block provided above an end portion of said supporting shaft, wherein an end of said end portion is sandwiched by said vertical guide block and is displaceable only in vertical direction along said vertical guide block, a lower end of a deflection adjusting screw screwed through said nut block comes into contact with an upper end of said end, a position in vertical direction of said end is adjusted by said deflection adjusting screw and inserted into said vertical guide block, an end fixing screw movable in up-to-down direction is screwed into said end, and said end is fixed on said vertical guide block by said end fixing screw.

* * * * *